(12) United States Patent
Inagaki et al.

(10) Patent No.: US 7,629,081 B2
(45) Date of Patent: Dec. 8, 2009

(54) NONAQUEOUS ELECTROLYTE SECONDARY BATTERY

(75) Inventors: Hiroki Inagaki, Kawasaki (JP);
Yoshinao Tatebayashi, Yokohama (JP);
Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 906 days.

(21) Appl. No.: 11/087,618

(22) Filed: Mar. 24, 2005

(65) Prior Publication Data
US 2005/0221187 A1    Oct. 6, 2005

(30) Foreign Application Priority Data

Mar. 30, 2004   (JP)   ............... 2004-099383
Feb. 14, 2005   (JP)   ............... 2005-036609

(51) Int. Cl.
*H01M 10/40*   (2006.01)
*H01M 4/48*   (2006.01)
*H01M 4/58*   (2006.01)

(52) U.S. Cl. .............. 429/231.1; 429/231.5; 429/231.8; 429/329; 429/340; 429/341

(58) Field of Classification Search .............. None
See application file for complete search history.

(56) References Cited

U.S. PATENT DOCUMENTS

2002/0136948 A1* 9/2002 Missling et al. ............. 429/212
2005/0064282 A1 3/2005 Inagaki et al.
2005/0069777 A1 3/2005 Takami et al.
2005/0221173 A1 10/2005 Tatebayashi et al.
2005/0221188 A1 10/2005 Takami et al.
2006/0134520 A1 6/2006 Ishii et al.
2008/0070115 A1 3/2008 Saruwatari et al.

FOREIGN PATENT DOCUMENTS

CN          1095191 A      11/1994
JP          2003-163029    6/2003
WO          WO 03/017409 A2 2/2003

OTHER PUBLICATIONS

Machine translation of JP 2003-163029, Jun. 2003.*
Ota, H., et al., "TPD-GC/MS analysis of the solid electrolyte interface (SEI) on a graphite anode in the propylene carbonate/ethylene sulfite electrolyte system for lithium batteries," J. Power Sources 97-98 (Jul. 2001), 107-113.*
Gerhard H. Wrodnigg, et al., "Cyclic and acyclic sulfites: new solvents and electrolyte additives for lithium ion batteries with graphitic anodes?", Journal of Power Sources 97-98, 2001, pp. 592-594.

* cited by examiner

*Primary Examiner*—Jonathan Crepeau
(74) *Attorney, Agent, or Firm*—Oblon, Spivak, McClelland, Maier & Neustadt, L.L.P.

(57) ABSTRACT

A nonaqueous electrolyte secondary battery includes a case, a nonaqueous electrolyte provided in the case and containing a linear sulfite, a positive electrode provided in the case and capable of absorbing-releasing Li element or Li ions, and a negative electrode provided in the case and containing a lithium titanium oxide and a conductive agent that includes a carbonaceous material.

16 Claims, 1 Drawing Sheet

NONAQUEOUS ELECTROLYTE SECONDARY BATTERY

CROSS-REFERENCE TO RELATED APPLICATIONS

This application is based upon and claims the benefit of priority from prior Japanese Patent Applications No. 2004-099383, filed Mar. 30, 2004; and No. 2005-036609, filed Feb. 14, 2005, the entire contents of both of which are incorporated herein by reference.

BACKGROUND OF THE INVENTION

1. Field of the Invention

The present invention relates to a nonaqueous electrolyte secondary battery such as a lithium ion secondary battery.

2. Description of the Related Art

The nonaqueous electrolyte secondary battery is charged and discharged by the migration of lithium ions between the negative electrode and the positive electrode. Vigorous research is being conducted on the nonaqueous electrolyte secondary battery as a battery having a high energy density.

In recent years, various characteristics are required for the nonaqueous electrolyte secondary battery. For example, a nonaqueous electrolyte secondary battery used as a power source for a digital camera is expected to be used under the discharge of about 3 C. Also, a nonaqueous electrolyte secondary battery for a vehicle such as a hybrid electric motor car is expected to be used under the discharge not lower than about 10 C. Such being the situation, high rate characteristics are required for the nonaqueous electrolyte secondary battery. Further, since the nonaqueous electrolyte secondary battery for a vehicle is expected to be used under a high temperature environment, an improvement in the high temperature characteristics is also required for the nonaqueous electrolyte secondary battery.

A nonaqueous electrolyte secondary battery using a lithium titanium oxide as the negative electrode active material has already been put to a practical use because the secondary battery is small in its expansion and shrinkage accompanying the charge-discharge of the secondary battery and is excellent in that the secondary battery has a long life. However, the nonaqueous electrolyte secondary battery using the lithium titanium oxide is defective in that the lithium titanium oxide is poor in its electrical conductivity and that the battery is inferior in the high rate characteristics.

Under the circumstances, it is attempted to improve the high rate characteristics by using a carbonaceous material such as acetylene black or carbon black as the conductive agent. However, the demands for the high rate characteristics are particularly strong. If the mixing ratio of the conductive agent is increased for meeting the particular demands, the energy density of the negative electrode is lowered.

A measure for improving the high rate characteristics is proposed in Japanese Patent Disclosure (Kokai) No. 2003-163029. Specifically, it is proposed to use a nonaqueous electrolyte containing as an additive ethylene sulfite represented by chemical formula (1) given below or propane sultone represented by chemical formula (2) given below:

According to the patent document quoted above, the low electrical conductivity of lithium titanate is derived from the rutile type titanium dioxide phase formed on the surface of lithium titanate. It is taught that ethylene sulfite or propane sultone forms an organic film of a high ionic conductivity in the initial charging stage of the secondary battery so as to cover the rutile type titanium dioxide phase having a low conductivity, with the result that the high rate characteristics of the secondary battery can be improved. However, this measure is incapable of achieving the high rate characteristics sufficiently.

BRIEF SUMMARY OF THE INVENTION

An object of the present invention is to provide a nonaqueous electrolyte secondary battery excellent in the high rate characteristics.

According to a first aspect of the present invention, there is provided a nonaqueous electrolyte secondary battery, comprising:

a case;

a nonaqueous electrolyte provided in the case and containing a linear sulfite;

a positive electrode provided in the case and capable of absorbing-releasing Li element or Li ions; and a negative electrode provided in the case and containing a lithium titanium oxide and a conductive agent that includes a carbonaceous material.

Further, according to a second aspect of the present invention, there is provided a nonaqueous electrolyte secondary battery, comprising:

a case;

a nonaqueous electrolyte provided in the case;

a positive electrode provided in the case and capable of absorbing-releasing Li element or Li ions;

a negative electrode provided in the case and containing a lithium titanium oxide and a conductive agent that includes a carbonaceous material; and a $Li_2SO_3$-containing layer formed on a surface of the negative electrode.

DETAILED DESCRIPTION OF THE INVENTION

As a result of an extensive research, the present inventors have found that the film on the surface of the negative electrode acts as a resistance component so as to lower the high rate characteristics of the secondary battery. Particularly, ethylene sulfite and propane sultone exhibit a high reactivity in the film-forming stage, thereby an organic film that is rough, unstable and exhibits a high resistance is formed. As a result, the high rate characteristics of the secondary battery is lowered.

Also, ethylene sulfite and propane sultone are low in resistance to oxidation so as to be decomposed at the interface between the positive electrode and the nonaqueous electrolyte, leading to the danger that the gas generation may be promoted. This danger is enhanced under the charged state and under the high temperature environment.

It should also be noted that ethylene sulfite has a low boiling point of about 68° C. Since ethylene sulfite is gasified under the storage test that is carried out at about 80° C. to about 90° C., the secondary battery using ethylene sulfite gives rise to a serious problem that the storage characteristics under high temperatures are markedly impaired.

On the other hand, it has been found that, in the nonaqueous electrolyte secondary battery comprising a negative electrode containing a lithium titanium oxide and a carbonaceous material used as a conductive agent, a reaction is generated between the carbonaceous material and the electrolyte under the high temperature environment, with the result that a large amount of gases are generated so as to impair various high temperature characteristics such as the high temperature storage characteristics and the high temperature charge-discharge cycle characteristics. However, the nonaqueous electrolyte secondary battery using a carbon material capable of absorbing-releasing lithium as a negative electrode active material is free from the problem pointed out above.

As a result of comparison between the two cases noted above, it has been found that, in the charge-discharge cycle of the secondary battery, the surface of the carbon material is covered with a film in the case where the carbon material is used as the negative electrode active material. On the other hand, the surface of the lithium titanium oxide and the carbon material is not covered with a film in the case where the negative-electrode active material is formed of the lithium titanium oxide. Such being the situation, it is considered reasonable to understand that the film serves to suppress the gas generation caused by the reaction between the carbon material and the electrolyte.

The film is formed under the negative electrode potential not higher than about 0.8V relative to the potential of Li metal. In the following description, the negative electrode potential denotes the value relative to the potential of Li metal unless otherwise specified. Particularly, a high quality film is formed under the negative electrode potential not lower than about 0.4V and not higher than about 0.5V. The Li absorbing-releasing potential of the carbon material that absorbs-releases lithium falls within a range of about 0.1V to about 0.9V. Also, the negative electrode potential is lowered to about 0.1V in the initial charging stage. It follows that the carbon material reacts with the electrolyte under the negative electrode potential not higher than about 0.8V so as to form a film and, then, the carbon material is stabilized. On the other hand, the Li absorbing-releasing potential of the lithium titanium oxide falls within a range of about 1.3V to about 3.0V, and a film is considered not to be formed.

Under the circumstances, a film is not formed on the surface in the negative electrode active material represented by the lithium titanium oxide, which has the Li absorbing-releasing potential nobler at least 1V than the potential of metal lithium. As a result, it was impossible to suppress the gas generation caused by the reaction between the carbonaceous material used as a conductive agent and the nonaqueous electrolyte.

As a result of an extensive research, the present inventors have found that, where the secondary battery comprises a negative electrode containing a lithium titanium oxide and a carbonaceous material and a nonaqueous electrolyte containing a linear sulfite, it is possible to form a high quality film excellent in its ionic conductivity on the surface of the negative electrode so as to make it possible to obtain a nonaqueous electrolyte secondary battery excellent in the high temperature characteristics and the high rate characteristics.

The nonaqueous electrolyte secondary battery comprises a case, a nonaqueous electrolyte housed in the case, a positive electrode housed in the case, and a negative electrode housed in the case. The negative electrode contains a negative electrode active material containing a lithium titanium oxide, and a conductive agent containing a carbonaceous material. The positive electrode serves to absorb and release Li element or Li ions. Further, the nonaqueous electrolyte contains at least one kind of an additive selected from the group consisting of dimethyl sulfite, diethyl sulfite, and methyl ethyl sulfite.

Incidentally, it is possible for the nonaqueous electrolyte secondary battery to further comprise a separator arranged between the positive electrode and the negative electrode and serving to hold the nonaqueous electrolyte. It is also possible to arrange a gel-like electrolyte layer or a solid electrolyte layer between the positive electrode and the negative electrode in place of the separator.

The nonaqueous electrolyte, the negative electrode, the positive electrode, the separator, and the case of the nonaqueous electrolyte secondary battery will now be described in detail.

1) Nonaqueous Electrolyte:

The nonaqueous electrolyte contains at least one kind of an additive selected from the group consisting of dimethyl sulfite, diethyl sulfite and methyl ethyl sulfite. Dimethyl sulfite has the chemical structure represented by chemical formula (3) given below, diethyl sulfite has the chemical structure represented by chemical formula (4) given below, and methyl ethyl sulfite has the chemical structure represented by chemical formula (5) given below:

(3)

(4)

(5)

Each of the additives given above forms a dense and stable film on the surface of the negative electrode under the negative electrode potential of about 1.3V. And, then, an unreacted additive is stably present under the ordinary voltage range of the nonaqueous electrolyte secondary battery. The formed film is stable within the voltage range of 0V to 5.0V, and is particularly stable within the voltage range of 1.0V to 1.5V. The present inventors considered that the film thus formed includes an inorganic film such as a $Li_2SO_3$ film and an organic film such as an $ROSO_2Li$ (R denoting an alkyl group) film. The present inventors have actually analyzed the film by the surface analysis. As a result, it has been confirmed that the film was formed of an inorganic film containing mainly $Li_2SO_3$ and minor components such as LiF and an organic film containing $ROSO_2Li$, $ROCO_2Li$, $R=CH_3(CH)CH_2$ or $R=CH_2-CH_2$. Incidentally, "R" of the compounds forming the organic film denotes an alkyl group.

The properties of the films formed on the surfaces of the negative electrodes were analyzed, covering the case where a linear sulfite selected from the group consisting of dimethyl sulfite, diethyl sulfite, and methyl ethyl sulfite was used as an additive and the case where the cyclic sulfite disclosed in Japanese Patent Disclosure No. 2003-163029 referred to previously, i.e., the cyclic sulfite such as ethylene sulfite or propane sultone, was used as the additive. A clear difference was recognized between the two cases noted above.

Figure 2:
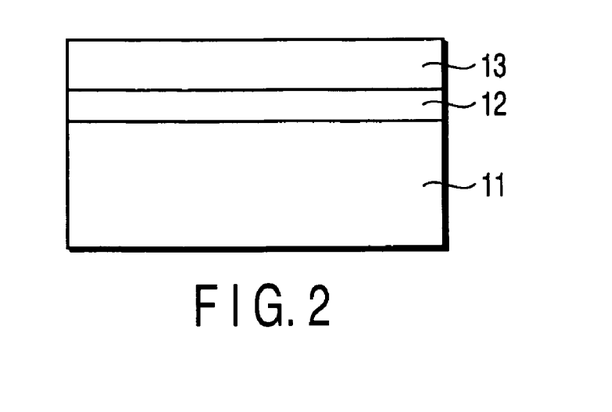
FIG. 2 schematically shows the surface state of the negative electrode included in the nonaqueous electrolyte secondary battery according to one embodiment of the present invention.

FIG. 2 shows the film formed on a negative electrode 11, covering the case where a linear sulfite selected from the group consisting of dimethyl sulfite, diethyl sulfite and methyl ethyl sulfite is used as the additive. As shown in FIG. 2, an inorganic film 12 containing mainly $Li_2SO_3$ and a minor component of, for example, LiF is preferentially formed first on the surface of the negative electrode 11. Then, an organic film 13 containing, for example, $ROSO_2Li$, $ROCO_2Li$, $R=CH_3(CH)CH_2$ and $R=CH_2-CH_2$ is slightly formed on the surface of the inorganic film 12.

The film on the surface of the negative electrode is formed on each of the lithium titanium oxide and the carbonaceous material. Particularly, it has been found that, if the film is formed on the surface of the carbonaceous material, which induces a gas generation, the effect of suppressing the gas generation is enhanced so as to make the secondary battery excellent in the high temperature charge-discharge cycle characteristics. Also, since the lithium titanium oxide reacts moderately with the linear sulfite, the resistance of the film itself is decreased because the formed film is dense and stable. As a result, the resistance to the migration of the charge at the interface of the film formed on the surfaces of the lithium titanium oxide and the carbonaceous material is made very small so as to improve the high rate characteristics. Among the linear sulfites, it is desirable to use diethyl sulfite as the additive to the nonaqueous electrolyte, because diethyl sulfite permits forming a film that is dense and excellent in its ionic conductivity.

The film formed in the case of using a linear sulfite is particularly excellent in the effect of suppressing the reaction between the negative electrode and γ-butyrolactone. It follows that the high temperature characteristics and the high rate characteristics of the nonaqueous electrolyte secondary battery can be further improved by adding γ-butyrolactone to the nonaqueous electrolyte containing a linear sulfite.

On the other hand, in the case of using a cyclic sulfite such as ethylene sulfite or propane sultone as the additive, a compound of a ternary system of Ti—O—S is certainly formed on the surface of $Li_{4/3}Ti_{5/3}O_4$ used as the negative electrode active material, as described in Japanese Patent Disclosure No. 2003-163029 quoted previously. However, the composition of the entire film including the ternary compound belongs to an organic film. The organic film, which certainly serves to suppress the gas generation, provides a resistance component so as to markedly inhibit the migration of the charge. As demonstrated by the Examples described herein later, the organic film markedly deteriorates the high rate characteristics.

The large difference in the high rate characteristics pointed out above is caused mainly by the difference in properties of the additives. The additive is reduced and decomposed on the surface of the negative electrode in the charging stage of the secondary battery. It is considered reasonable to understand that the substance and the properties of the film formed on the surface of the negative electrode are changed by the difference in the reaction rate and the decomposing potential of the reducing reaction for the additive.

It should also be noted that the additive used in one embodiment of the present invention has a high boiling point and, thus, is excellent in the high temperature storage characteristics. For example, dimethyl sulfite has a boiling point of about 126° C., and diethyl sulfite has a boiling point of about 159° C.

The additives used in one embodiment of the present invention are excellent in the resistance to oxidation. As a result, the unreacted additive is unlikely to be decomposed by oxidation on the positive electrode and, thus, the gas generation is unlikely to be promoted. It follows that the over-charging characteristics, the high temperature charge-discharge cycle characteristics and the high temperature storage characteristics are unlikely to be impaired.

It is desirable for the additive to be used in an amount of 0.1% by weight to 10.0% by weight based on the amount of the nonaqueous electrolyte.

If the amount of the additive is smaller than 0.1% by weight, it is difficult for the additive to cover the entire surface of the carbonaceous material, with the result that the effect of suppressing the gas generation may possibly be lowered. On the other hand, if the additive is used in an amount exceeding 10.0% by weight, it is possible for the unreacted additive dissolved in the nonaqueous electrolyte to deteriorate the characteristics of the nonaqueous electrolyte.

It is more desirable to use the additive in an amount of 0.8% by weight to 5.0% by weight. Where the additive is used in an amount falling within the ranges given above, it is possible to form a particularly dense and stable film. Particularly, if the additive addition amount exceeds 5.0% by weight, the reactivity of the film-forming reaction is enhanced so as to form a rough and unstable film. In this case, the formed film provides a resistance component, with the result that the high rate characteristics of the secondary battery may be deteriorated.

Incidentally, the addition amounts of the additives pointed out above denote the values corresponding to the mixing amounts and specific surface areas of each of the carbonaceous material and the negative electrode active material.

It is possible for the nonaqueous electrolyte having the additive added thereto to be in the form of a liquid or a gel. A nonaqueous electrolyte comprises an organic solvent and an electrolyte dissolved in the organic solvent. On the other hand, the gel-like nonaqueous electrolyte can be in the form of a composite material containing a liquid electrolyte and a polymer material.

The liquid nonaqueous electrolyte can be prepared by, for example, dissolving an electrolyte in an organic solvent in a concentration of 0.5 to 2 mol/L.

The electrolyte includes, for example, $LiBF_4$, $LiPF_6$, $LiAsF_6$, $LiClO_4$, $LiCF_3SO_3$, $LiN(CF_3SO_2)_2$, $LiN(C_2F_5SO_2)_2$, $Li(CF_3SO_2)_3C$, and $LiB[(OCO)_2]_2$. These electrolytes can be used singly or in the form of a mixture of a plurality of different kinds of these electrolytes.

The organic solvent includes, for example, cyclic carbonates such as propylene carbonate (PC), and ethylene carbonate (EC); linear carbonates such as diethyl carbonate (DEC), dimethyl carbonate (DMC), and methyl ethyl carbonate (MEC); linear ethers such as dimethoxy ethane (DME) and diethoxy ethane (DEE); cyclic ethers such as tetrahydrofuran (THF), and dioxolane (DOX); and other organic solvents such as γ-butyrolactone (GBL), acetonitrile (AN) and sulfolane (SL). These organic solvents can be used singly or in the form of a mixture of a plurality of these organic solvents.

In order to obtain a secondary battery excellent in both the high rate characteristics and the high temperature characteristics, it is desirable to use an organic solvent containing γ-butyrolactone. The volume ratio of γ-butyrolactone to the organic solvent should desirably be 30% to 90%, more desirably 50% to 75%.

The polymer material includes, for example, polyvinylidene fluoride (PVdF), polyacrylonitrile (PAN) and polyethylene oxide (PEO).

2) Negative Electrode

The negative electrode includes a negative electrode current collector and a negative electrode layer formed on one surface or both surfaces of the negative electrode current collector. The negative electrode layer contains a negative electrode active material, a conductive agent, and a binder.

The Li absorbing-releasing potential of the negative electrode active material is nobler at least 1V than the potential of lithium metal. Incidentally, the negative electrode active material can absorb and/or release Li element or Li ions. "Li absorbing-releasing potential of the negative electrode active material" means a potential at which the negative electrode absorbs or releases Li element or Li ions.

The negative electrode active material having a Li absorbing-releasing potential nobler than 1V includes, for example, lithium titanium oxide such as lithium titanate, tungsten oxide, molybdenum oxide, iron sulfide, and titanium sulfide. The lithium titanium oxide can absorb and/or release Li ions.

It is desirable for the negative electrode active material to include lithium titanate.

In the case of the lithium titanium oxide as the negative electrode active material, the Li absorbing-releasing potential of the negative electrode is about 1.3V to about 3.0V relative to the potential of a lithium metal counter electrode. This potential range overlaps with the potential range of 1.0V to 1.5V within which the film formed by the additive is present with a high stability. Also, it is desirable to use the lithium titanium oxide as the negative electrode active material because the lithium titanium oxide has a long life.

Incidentally, the Li absorbing-releasing potential of the negative electrode differs depending on the crystal structure of lithium titanium oxide. For example, in the case of the Spinel type lithium titanate, the Li absorbing-releasing potential of the negative electrode is about 1.3V to 2.0V relative to the potential of lithium metal. Particularly, the Li absorbing-releasing reaction of the lithium titanate takes place around about 1.5V. In the case of using the anatase type titanium oxide as the negative electrode active material, the Li absorbing-releasing potential of the negative electrode is about 1.5V to about 3.0V relative to the potential of lithium metal. Particularly, the absorbing-releasing reaction of the titanium oxide takes place around the potential of about 2.0V. Further, in the case of using the ramsdellite type lithium titanate as the negative electrode active material, the Li absorbing-releasing potential of the negative electrode is about 1.0V to about 2.3V relative to the potential of the lithium metal.

It is desirable to use the Spinel type lithium titanate represented by the chemical formula $Li_{4+x}Ti_5O_{12}$ ($0 \leq x \leq 3$) as the negative electrode active material.

As described above, the lithium absorbing-releasing reaction is generated at the potential of about 1.5V in the negative electrode containing the Spinel type lithium titanate as the negative electrode active material. On the other hand, the film formed by the additive is particularly stable under the potential of 1.0V to 1.5V. It follows that, where lithium titanate having the Spinel structure is used as the negative electrode active material, the additive is present with a particularly high stability so as to produce the particular effect.

The negative electrode active material is used in the granular form. It is desirable for the particles of the negative electrode active material to have a specific surface area of 1 $m^2$/g to 30 $m^2$/g as determined by the BET method.

If the specific surface area is smaller than 1 $m^2$/g, the effective area of the negative electrode active material contributing to the electrode reaction is small so as to impair the high rate characteristics of the secondary battery. On the other hand, if the specific surface area noted above exceeds 30 $m^2$/g, the interface between the negative electrode active material and the nonaqueous electrolyte is increased so as to increase the required amount of the additive used and to lower the high rate characteristics of the secondary battery.

It is more desirable for the specific surface area of the negative electrode active material to fall within a range of 5 $m^2$/g to 10 $m^2$/g.

Incidentally, the nonaqueous electrolyte may be decomposed under the potential not lower than 5V. Therefore, in manufacturing a nonaqueous electrolyte secondary battery having a battery voltage of about 2V, the upper limit of the Li absorbing-releasing potential of the negative electrode is about 3V. Incidentally, the battery voltage is obtained by subtracting the negative electrode potential from the positive electrode potential.

A carbonaceous material is used as a conductive agent for improving the conductivity and suppressing the contact resistance with the current collector. The additive permits forming a dense and stable film on the surface of the carbonaceous material. The film thus formed inhibits the reaction between the carbonaceous material and the nonaqueous electrolyte and is high in its effect of suppressing the gas generation and in its effect of improving the charge-discharge cycle characteristics of the secondary battery under high temperatures. The carbonaceous material includes, for example, acetylene black, carbon black, coke, carbon fiber, and graphite. Particularly, it is desirable for the carbonaceous material to have the properties described in the following in view of the film properties, particularly, the film resistance.

It is desirable for the carbonaceous material to have a layer spacing ($d_{002}$) of the (002) plane falling within a range of 0.344 nm to 0.352 nm, and the crystallite size (Lc) in the C-axis direction, which is not larger than 10 nm.

In the carbonaceous material having the layer spacing $d_{002}$ smaller than 0.344 nm and the crystallite size Lc larger than 10 nm, the degree of graphitization is high. As a result, the reaction with the additive is greatly promoted in the edge plane of the graphite crystal and, thus, a film is formed thick in the edge plane of the graphite crystal so as to inhibit the charge migration. It follows that it may be difficult to obtain the high rate characteristics of the secondary battery. On the other hand, in the carbonaceous material having the layer spacing $d_{002}$ larger than 0.352 nm, the degree of graphitization is low. In addition, the functional group remaining on the surface promotes the reaction with the additive because carbonaceous material is manufactured with a low calcining temperature, with the result that the film is formed thick so as to inhibit the charge migration. It follows that it is difficult to obtain high rate characteristics sufficiently.

Under the circumstances, it is desirable for the carbonaceous material to have the layer spacing ($d_{002}$) of the (002) plane falling within a range of 0.344 nm to 0.352 nm and the crystallite size (Lc) in the C-axis direction, which is not larger than 10 nm. The carbonaceous material satisfying the particular requirements includes, for example, a graphitizing carbon such as coke. Also, it is desirable for the lower limit of the crystallite size Lc to be set at 1 nm, because a large amount of the functional groups are present on the surface of the carbonaceous material having less than 1 nm of the crystallite size Lc, with the result that the film is formed thick so as to inhibit the charge migration.

In order to improve the conductivity, it is desirable for the carbonaceous material to have a specific surface area not smaller than 10 m$^2$/g as determined by the BET method. Also, in order to enhance the effect of suppressing the gas generation, it is desirable for the carbonaceous material to have a specific surface area not larger than 100 m$^2$/g.

Also, the carbonaceous material is granular. In order to allow the carbonaceous material to contribute to the improvement in the effect of suppressing the gas generation, it is desirable for the carbonaceous material to have an average particle diameter not smaller than 0.5 μm. Also, in order to improve the conductivity, it is desirable for the carbonaceous material to have an average particle diameter not larger than 5 μm.

The carbonaceous material may be a mixture of two or more materials that differ in specific surface area or particle diameter.

The binder used for bonding the active material and the conductive agent includes, for example, polytetrafluoroethylene (PTFE), polyvinylidene fluoride (PVdF), a fluorinated rubber, and styrene-butadiene rubber.

Concerning the mixing ratios of the negative electrode active material, the conductive agent, and the binder, it is desirable for the negative electrode active material to be contained in an amount of 70% by weight to 96% by weight, for the conductive agent to be contained in an amount of 2% by weight to 28% by weight, and for the binder to be contained in an amount of 2% by weight to 28% by weight. If the amount of the conductive agent is smaller than 2% by weight, the conductivity of the negative electrode layer tends to be lowered so as to lower the high rate characteristics of the nonaqueous electrolyte secondary battery. Also, if the amount of the binder is smaller than 2% by weight, the bonding strength between the negative electrode layer and the negative electrode current collector tends to be lowered so as to impair the charge-discharge cycle characteristics of the nonaqueous electrolyte secondary battery. On the other hand, it is desirable for each of the conductive agent and the binder to be contained in an amount not larger than 28% by weight in view of the capacity increase of the secondary battery.

It is desirable for the negative electrode current collector to be formed of an aluminum foil or an aluminum alloy foil that is stable within a potential range nobler than 1V.

The negative electrode can be manufactured by, for example, suspending a negative electrode active material, a conductive agent and a binder in a solvent, followed by coating a current collector formed of an aluminum foil or an aluminum alloy foil with the resultant suspension and subsequently drying and pressing the current collector coated with the suspension.

3) Positive Electrode

The positive electrode includes a positive electrode current collector and a positive electrode layer formed on one surface or both surfaces of the positive electrode current collector.

The positive electrode layer contains a positive electrode active material, a conductive agent, and a binder.

The positive electrode active material includes, for example, oxides, sulfides, and polymers. The oxides include, for example, manganese dioxide ($MnO_2$) absorbing Li element or Li ions, iron oxide, copper oxide, nickel oxide, a lithium-manganese composite oxide such as $Li_xMn_2O_4$ or $Li_xMnO_2$, a lithium-nickel composite oxide such as $Li_xNiO_2$, a lithium-cobalt composite oxide such as $Li_xCoO_2$, a lithium-nickel-cobalt composite oxide such as $Li_xNi_{1-y}Co_yO_2$, a lithium-manganese-cobalt composite oxide such as $Li_xMn_yCo_{1-y}O_2$, Spinel type lithium-manganese-nickel composite oxide such as $Li_xMn_{2-y}Ni_yO_4$, a lithium-phosphorus oxides having an olivine structure such as $Li_xFePO_4$, $Li_xFe_{1-y}Mn_yPO_4$, and $Li_xCoPO_4$, an iron sulfate such as $Fe_2(SO_4)_3$, and a vanadium oxide such as $V_2O_5$.

The polymers include, for example, conductive polymer materials such as polyaniline and polypyrrole and disulfide based polymer materials. Further, it is possible to use sulfur (S) and fluorocarbon as the positive electrode active material.

The desirable positive electrode active materials include, for example, a lithium-manganese composite oxide such as $Li_xMn_2O_4$, a lithium-nickel composite oxide such as $Li_xNiO_2$, a lithium-cobalt composite oxide such as $Li_xCoO_2$, a lithium-nickel-cobalt oxide such as $Li_xNi_{1-y}Co_yO_2$, Spinel type lithium-manganese-nickel composite oxide such as $Li_xMn_{2-y}Ni_yO_4$, a lithium-manganese-cobalt composite oxide such as $Li_xMn_yCo_{1-y}O_2$, and a lithium-phosphorus oxides such as $Li_xFePO_4$. It should be noted that the materials exemplified above make it possible to obtain a high positive electrode voltage. Incidentally, it is desirable for each of x and y included in the chemical formulas given above to fall within a range of 0 to 1.

Incidentally, the nonaqueous electrolyte may be decomposed under the potential not lower than 5V. Therefore, it is desirable for the Li absorbing-releasing potential of the positive electrode to be up to about 5V.

The conductive agent effective for enhancing the conductivity and suppressing the contact resistance with the current collector includes, for example, acetylene black, carbon black, and graphite.

The binder for bonding the active material and the conductive agent includes, for example, polytetrafluoroethylene (PTFE), polyvinylidene fluoride (PVdF), and a fluorinated rubber.

When it comes to the mixing ratios of the positive electrode active material, the conductive agent and the binder, it is desirable for the positive electrode active material to be contained in an amount of 80 to 95% by weight, for the conductive agent to be contained in an amount of 3 to 18% by weight, and for the binder to be contained in an amount of 2 to 17% by weight. Where the conductive agent is contained in an amount not smaller than 3% by weight, it is possible to obtain the effect described above. Also, where the amount of the conductive agent is not larger than 18% by weight, it is possible to suppress the decomposition of the nonaqueous electrolyte on the surface of the conductive agent during storage of the secondary battery under high temperatures. Further, where the binder is contained in an amount not smaller than 2% by weight, a sufficient electrode strength can be obtained. Also, where the amount of the binder is not larger than 17% by weight, the amount of the insulating material contained in the electrode can be decreased so as to lower the internal resistance.

It is desirable for the positive electrode current collector to be formed of an aluminum foil or an aluminum alloy foil.

The positive electrode can be prepared by, for example, dispersing a positive electrode active material, a conductive agent and a binder in a suitable solvent so as to prepare a suspension, followed by coating a current collector consisting of an aluminum foil or an aluminum alloy foil with the resultant suspension and subsequently drying and pressing the current collector coated with the suspension.

4) Separator

The separator is formed of, for example, a synthetic resin nonwoven fabric, a polyethylene porous film, or a polypropylene porous film.

5) Case

The case includes, for example, a container formed of a laminate film having a thickness of 0.2 mm or less or a metal container having a thickness not larger than 0.5 mm. It is desirable for the case to have a thickness not larger than 0.2 mm. Concerning the shape, the case is of the flattened type, prismatic type, cylindrical type, coin type, button type, sheet type, or laminate type. Incidentally, it is possible for the nonaqueous electrolyte secondary battery to be a small battery mounted to a portable electronic device and a large battery mounted to an electric vehicle.

It is desirable for the laminate film to be a multi-layered film comprising a metal layer and a resin layer covering the metal layer. For decreasing the weight of the secondary battery, it is desirable to use an aluminum foil or an aluminum alloy foil as the metal layer. The resin layer, which serves to reinforce the metal layer, can be formed of a polymer compound such as polypropylene (PP), polyethylene (PE), nylon, or polyethylene terephthalate (PET). The sealing by thermal fusion is employed for forming the laminate film into a container and for sealing the container.

The metal container is formed of, for example, aluminum or an aluminum alloy. It is desirable for the aluminum alloy to contain, for example, magnesium, zinc or silicon. On the other hand, it is desirable for the amount of transition metals such as iron, copper, nickel and chromium, which are contained in aluminum or the aluminum alloy, to be not larger than 100 ppm.

Incidentally, the case formed of a flexible material such as the laminate film is capable of being markedly expanded in response to the gas generation so as to produce a prominent effect.

Figure 1:
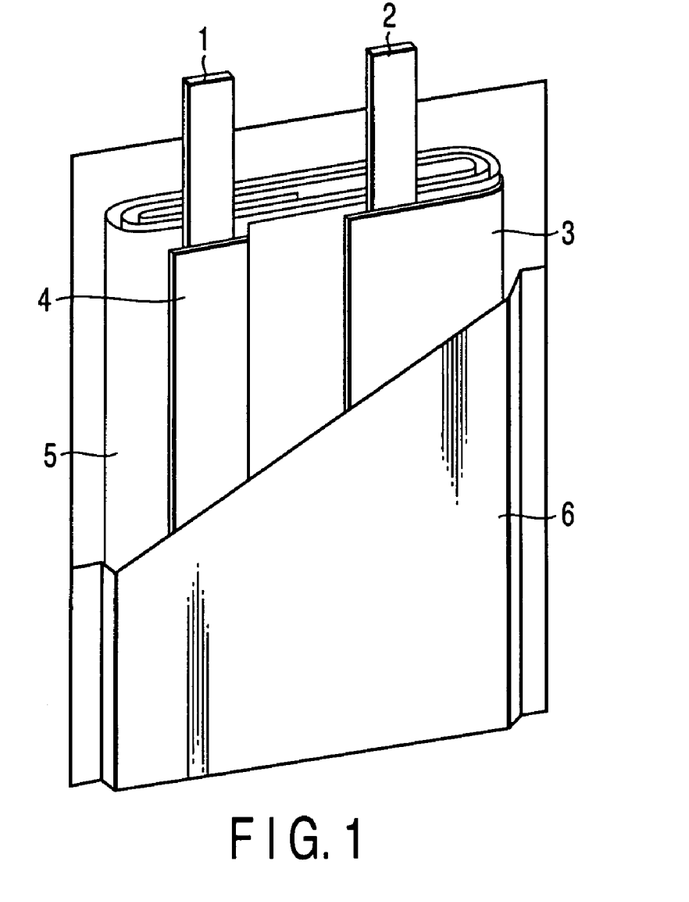
FIG. 1 an oblique view, partly broken away, showing the construction of a nonaqueous electrolyte secondary battery according to one embodiment of the present invention.

FIG. 1 shows the construction of a flattened type nonaqueous electrolyte secondary battery according to one embodiment of the nonaqueous electrolyte secondary battery of the present invention. To be more specific, FIG. 1 is an oblique view, partly broken away, showing the construction of a flattened type lithium ion secondary battery of the present invention.

As shown in the drawing, a wound type flattened electrode group is housed in a bag-shaped case 6 formed of a film material. The wound type flattened electrode group is prepared by spirally winding in a flattened shape a laminate structure including a positive electrode 3, a negative electrode 4, and a separator 5 interposed between the positive electrode 3 and the negative electrode 4. A nonaqueous electrolyte is held by the electrode group. A band-like positive electrode terminal 2 is electrically connected to the positive electrode 3, and the tip portion of the positive electrode terminal 2 is withdrawn from inside the case 6 to the outside. On the other hand, a band-like negative electrode terminal 1 is electrically connected to the negative electrode 4, and the tip portion of the negative electrode terminal 1 is withdrawn from inside the case 6 to the outside.

Described in the following are Examples of the present invention. Needless to say, the technical scope of the present invention is not limited by the following Examples.

EXAMPLES 1 TO 11 AND COMPARATIVE EXAMPLES 1 TO 3

The nonaqueous electrolyte secondary battery for each of Examples 1 to 11 and Comparative Examples 1 to 3 was manufactured as follows.

<Preparation of Negative Electrode>

A slurry was prepared by adding 90% by weight of $Li_4Ti_5O_{12}$ used as a negative electrode active material and having a specific surface area of 9 $m^2/g$, 5% by weight of acetylene black used as a conductive agent, and having a specific surface area of 10 $m^2/g$, a layer spacing $d_{002}$ of 0.3553 nm, and a crystallite size Lc of 1.12 nm, and 5% by weight of polyvinylidene fluoride (PVdF) to an N-methyl pyrrolidone (NMP). Then, an aluminum foil having a thickness of 15 μm was coated with the slurry thus obtained, followed by drying and, then, pressing the aluminum foil coated with the slurry so as to manufacture a negative electrode having an electrode density of 3.0 $g/cm^3$ and an electrode specific surface area of 5.0 $m^2/g$.

<Preparation of Positive Electrode>

A slurry was prepared by adding 90% by weight of a lithium-cobalt oxide ($LiCoO_2$) powder used as a positive electrode active material, 3% by weight of acetylene black, 3% by weight of graphite, and 4% by weight of polyvinylidene fluoride (PVdF) to N-methyl pyrrolidone (NMP). Then, the both surfaces of a current collector formed of an aluminum foil having a thickness of 15 μm were coated with the slurry thus prepared, followed by drying and, then, pressing the current collector coated with the slurry so as to manufacture a positive electrode having an electrode density of 3.0 $g/cm^3$.

<Preparation of Electrode Group>

A laminate structure consisting of the positive electrode noted above, a separator formed of a polyethylene porous film having a thickness of 25 μm, the negative electrode noted above, and another separator was spirally wound, followed by pressing the wound laminate structure so as to obtain a flattened electrode group having a width of 30 mm and a thickness of 3.0 mm. The electrode group thus obtained was housed in a pack formed of a laminate film having a thickness of 0.1 mm and including an aluminum foil having a thickness of 40 μm and a polypropylene layer formed on each of the both surfaces of the aluminum foil. The pack housing the electrode group was dried under vacuum for 24 hours at about 80° C.

<Preparation of Liquid Nonaqueous Electrolyte>

A nonaqueous solvent was prepared by mixing ethylene carbonate (EC) and γ-butyrolactone (GBL) in a volume ratio of 25:75, followed by dissolving lithium tetrafluoroborate ($LiBF_4$) in the mixed nonaqueous solvent thus prepared in an amount of 1.5 mol/L so as to obtain a solution. Then, a liquid nonaqueous electrolyte was prepared by adding the linear sulfite or cyclic sulfite shown in Table 1 to the solution thus prepared. Incidentally, any of the linear sulfite and the cyclic sulfite was not added in Comparative Example 3.

The liquid nonaqueous electrolyte was poured into the laminate film pack housing the electrode group, followed by sealing the pack by the heat seal so as to manufacture a nonaqueous electrolyte secondary battery constructed as shown in FIG. 1. The nonaqueous electrolyte secondary battery thus manufactured was sized at 35 mm in width, 3.2 mm in thickness, and 65 mm in height.

For examining the high rate characteristics of the secondary batteries, the discharge capacity ratios of 3 C/0.2 C and 10 C/0.2 C were measured for the nonaqueous electrolyte secondary battery for each of Examples 1 to 11 and Comparative Examples 1 to 3.

Then, a charge-discharge cycle test was conducted under a high temperature (45° C.) in order to examine the charge-discharge cycle characteristics of the secondary battery under the high temperature. The cycle test was conducted with the current value set at 1 C mA, and the charge-discharge cycle was repeated with the battery voltage set to fall within a range of 1 to 3V. The number of charge-discharge cycles until the cycle at which the discharge capacity was lowered to 80% of the initial capacity was regarded as the charge-discharge cycle life.

Finally, in order to examine the charge-discharge cycle characteristics under high temperatures, particularly, the gas generation caused by the reaction between the carbonaceous material and the nonaqueous electrolyte under the high temperature environment, the thickness of the battery after the charge-discharge cycle test under high temperatures was measured by a slide gage. A rate of change X(%) in the thickness of the battery after the charge-discharge cycle test at 45° C. was obtained by formula (I) given below by using the thickness of the battery thus measured:

$$X(\%) = 100 \times \{(T_1 - T_2)/T_2\} \quad (I)$$

where $T_1$ denotes the thickness of the battery after the cycle test under the high temperature environment, and $T_2$ denotes the thickness of the battery before the cycle test under the high temperature environment.

Table 1 shows the results of the measurement of the discharge capacity retention rate and the cycle test under the high temperature environment.

Also, the secondary battery charged to 3.0V was stored for 24 hours under an environment of 85° C. so as to measure the change in thickness of the secondary battery caused by the storage under the high temperature environment. Table 1 also shows the result.

TABLE 1

| | Additive | | High rate characteristic test | | High temperature cycle characteristic test | | High temperature storage characteristics Change in battery thickness after storage at 85° C. |
|---|---|---|---|---|---|---|---|
| | | | 3 C/0.2 C discharge | 10 C/0.2 C discharge | High temperature (45° C.) charge-discharge cycle life | Change in battery thickness | |
| | Compound name | Addition amount | capacity ratio | capacity ratio | (the number of times) | after cycle test | |
| Example 1 | DES | 0.05 wt % | 80 | 40 | 350 | 100% | 20% |
| Example 2 | DES | 0.10 wt % | 88 | 50 | 850 | 3% | +2% or less |
| Example 3 | DES | 0.30 wt % | 90 | 60 | 900 | +2% or less | +2% or less |
| Example 4 | DES | 0.50 wt % | 91 | 65 | 1000 | +2% or less | +2% or less |
| Example 5 | DES | 1.0 wt % | 93 | 87 | 1100 | +2% or less | +2% or less |
| Example 6 | DES | 3.0 wt % | 93 | 85 | 1000 | +2% or less | +2% or less |
| Example 7 | DES | 5.0 wt % | 93 | 80 | 950 | +2% or less | +2% or less |
| Example 8 | DES | 10.0 wt % | 84 | 50 | 850 | +2% or less | +2% or less |
| Example 9 | DES | 20.0 wt % | 60 | 40 | 500 | +2% or less | +2% or less |
| Example 10 | MES | 1.0 wt % | 92 | 85 | 1100 | +2% or less | +2% or less |
| Example 11 | DMS | 1.0 wt % | 92 | 80 | 1100 | +2% or less | +2% or less |
| Comparative Example 1 | PS | 1.0 wt % | 85 | 30 | 900 | +2% or less | 100% or more |
| Comparative Example 2 | ES | 1.0 wt % | 80 | 15 | 900 | +2% or less | 100% or more |
| Comparative Example 3 | LiBF$_4$ | 1.5 (mol/L) | 75 | 10 | 300 | 400% | 100% or more |
| Comparative Example 4 | DES | 1.0 wt % | 70 | 10 | 100 | 200% | 100% or more |

Note:
DES: diethyl sulfite;
MES: methyl ethyl sulfite;
DMS: dimethyl sulfite;
PS: propylene sulfite;
ES: ethylene sulfite;

As shown in Table 1, the nonaqueous electrolyte secondary battery for each of Examples 2 to 11 comprising a nonaqueous electrolyte having a linear sulfite added thereto is generally superior to the nonaqueous electrolyte secondary battery for each of Comparative Examples 1 to 3 in the 3 C/0.2 C discharge capacity ratio and the 10 C/0.2 C discharge capacity ratio, which support excellent high rate characteristics. Also, the nonaqueous electrolyte secondary battery for each of the Examples exhibits a long charge-discharge cycle life under high temperatures, which supports excellent charge-discharge cycle characteristics under high temperatures.

Diethyl sulfite (DES), methyl ethyl sulfite (MES) and dimethyl sulfite (DMS) were used as additives in Examples 5, 10 and 11, respectively. On the other hand, propylene sulfite (PS) and ethylene sulfite (ES) were used in Comparative Examples 1 and 2, respectively. As apparent from Table 1, the secondary batteries for Examples 5, 10 and 11 were found to be superior to the secondary batteries for Comparative Examples 1 and 2 in any of the 3 C/0.2 C discharge capacity ratio, the 10 C/0.2 C discharge capacity ratio, and the charge-discharge cycle life under high temperatures. It follows that the additive used in the present invention permits improving the high rate characteristics and the charge-discharge cycle characteristics of the secondary battery under high temperatures. Particularly, the secondary battery for Example 5 using DES as the additive was found to be superior to the secondary battery for Example 10 using MES as the additive and to the secondary battery for Example 11 using DMS as the additive in any of the 3 C/0.2 C discharge capacity ratio and the 10 C/0.2 C discharge capacity ratio.

Incidentally, in the secondary battery using propylene sulfite (PS) or ethylene sulfite (ES) as the additive, the 10 C/0.2 C discharge capacity ratio was markedly lowered, compared with the 3 C/0.2 C discharge capacity ratio. It is considered reasonable to understand that the marked reduction in the 10 C/0.2 C discharge capacity ratio was caused by the situation that the film formed by propylene sulfite (PS) or ethylene sulfite (ES) is rough and unstable.

In Examples 1 to 9, diethyl sulfite was added in an amount of 0.1% by weight to 10.0% by weight. In these cases, the charge-discharge cycle life of the secondary battery under high temperatures was further prolonged and, thus, the secondary battery was found to be particularly excellent in the charge-discharge cycle characteristics under high temperatures. The experimental data support that, if the additive is used in an amount not smaller than 0.1% by weight, the surface of the carbonaceous material can be sufficiently covered with the additive. Also, where the additive is used in an amount not larger than 10.0% by weight, it is possible to suppress the deterioration of the battery characteristics caused by the unreacted additive.

The experimental data for Examples 1 to 9 support that the 10 C/0.2 C discharge capacity ratio is high if diethyl sulfite is added in an amount falling within a range of 1.0% by weight to 5.0% by weight so as to permit the secondary battery to be excellent in the high rate characteristics. It follows that, if the additive is used in an amount falling within the range noted above, it is possible to form a particularly dense and stable film.

The composition of the film formed on the surface of the negative electrode included in the secondary battery manufactured in each of Examples 1 to 11 was analyzed as follows. In the first step, the nonaqueous electrolyte secondary battery, which had been charged under room temperature to 3.0V under the current of 0.2 C, was put in an argon glove box having a dew point of about −70° C. and, then, dismantled so as to take out a part (1 cm square) of the negative electrode as a negative electrode sample. The composition of the film formed on the surface of the negative electrode sample was analyzed by an X-ray photoelectron spectroscopy.

The film was found to have included an inorganic layer formed of $Li_2SO_3$ and LiF and an organic layer containing at least one compound selected from the group consisting of $ROSO_2Li$, $ROCO_2Li$, $R=CH_3(CH)CH_2$ and $R=CH_2—CH_2$.

The storage test carried out at 85° C. supports that the secondary battery for each of Examples 1 to 11 using a nonaqueous electrolyte containing a linear sulfite is lower in its swelling rate at 85° C. than that of the secondary battery for each of Comparative Examples 1 to 3. This indicates that the excess linear sulfite remaining in the nonaqueous electrolyte is present stably within the cell.

On the other hand, in the secondary battery in each of Comparative Examples 1 and 2 using a cyclic sulfite such as propylene sulfite (PS) or ethylene sulfite (ES), the cyclic sulfite remaining in the nonaqueous electrolyte is easily gasified under the high temperature environment of 85° C., with the result that the swelling rate was increased to 100% or more. Further, when it comes to the secondary battery for Comparative Example 3 in which any of the linear sulfite and the cyclic sulfite was not contained in the nonaqueous electrolyte, $LiBF_4$ used as the electrolyte performed the function of the additive for forming the film, with the result that an inorganic film consisting of LiF was formed on the surface of the negative electrode. The inorganic film thus formed was insufficient for producing the effect of suppressing the reaction between the nonaqueous electrolyte and the negative electrode, as apparent from the experimental data given in Table 1 in respect of the change in battery thickness after the cycle test. Such being the situation, the swelling rate in the storage test at 85° C. was increased to 100% or more in Comparative Example 3.

COMPARATIVE EXAMPLE 4

Manufactured was a nonaqueous electrolyte secondary battery equal in construction to the secondary battery for Example 5, except that FeS having a specific surface area of 1.2 $m^2/g$ as measured by the BET method was used as the negative electrode active material. The Li absorbing-releasing potential of FeS was 1.8V relative to the potential of the lithium metal.

The nonaqueous electrolyte secondary battery manufactured in Comparative Example 4 was subjected to the high rate characteristic test, the high temperature charge-discharge cycle characteristic test, and the high temperature storage test under the conditions equal to those described previously. Table 1 also shows the results.

As shown in Table 1, the nonaqueous electrolyte secondary battery for Comparative Example 4 was found to be inferior to the nonaqueous electrolyte secondary battery for any of Examples 1 to 11 in any of the high rate characteristics, the high temperature charge-discharge cycle characteristics, and the high temperature storage characteristics. It should be noted in this connection that the negative electrode active material used in Comparative Example 4 exhibits the Li absorbing-releasing potential nobler at least 1V than the potential of lithium metal. However, since the negative electrode active material was not formed of lithium titanium oxide, an inorganic film containing $Li_2SO_3$ was not formed in Comparative Example 4, leading to the poor battery characteristics as pointed out above.

As apparent from the experimental data pointed out above, the secondary battery for each of Examples 1 to 11 comprising a negative electrode containing a lithium titanium oxide and a carbonaceous material and a nonaqueous electrolyte containing a linear sulfite permits improving the discharge capacity under a high rate of 10 C without impairing the charge-discharge cycle life at 45° C. while suppressing the swelling of the secondary battery during the cycle test and during the storage at 85° C.

EXAMPLES 12 TO 23

Manufactured were nonaqueous electrolyte secondary batteries similar to those for Examples 1 to 11, except that coke having a specific surface area of 80 $m^2/g$ as measured by the BET method, a layer spacing $d_{002}$ of 0.3504 nm, and a crystallite size Lc of 1.89 nm was used as the conductive agent in place of acetylene black used in Examples 1 to 11. These nonaqueous electrolyte secondary batteries were evaluated as in Examples 1 to 11. Table 2 shows the results.

EXAMPLES 24 TO 35

Manufactured were nonaqueous electrolyte secondary batteries similar to those for Examples 1 to 11, except that graphite having a specific surface area of 10 m$^2$/g as measured by the BET method, a layer spacing $d_{002}$ of 0.3356 nm, and a crystallite size Lc of 100 nm was used as the conductive agent in place of acetylene black used in Examples 1 to 11. These nonaqueous electrolyte secondary batteries were evaluated as in Examples 1 to 11. Table 3 shows the results.

The composition of the film formed on the surface of the negative electrode of the secondary battery for each of Examples 12 to 35 was analyzed as in Example 1. The film for each of these Examples was found to include an inorganic layer formed of $Li_2SO_3$ and LiF and an organic layer containing at least one compound selected from the group consisting of $ROSO_2Li$, $ROCO_2Li$, $R=CH_3(CH)CH_2$ and $R=CH_2-CH_2$.

TABLE 2

| | Additive | | High rate characteristic test | | High temperature cycle characteristic test | | High temperature storage characteristics |
|---|---|---|---|---|---|---|---|
| | | | | | High temperature (45° C.) | Change in | Change in battery |
| | | | 3 C/0.2 C discharge | 10 C/0.2 C discharge | charge-discharge | battery | thickness after |
| | Compound name | Addition amount | capacity ratio | capacity ratio | cycle life (the number of times) | thickness after cycle test | storage at 85° C. |
| Example 12 | DES | 0.05 wt % | 84 | 52 | 500 | 5% | +2% or less |
| Example 13 | DES | 0.10 wt % | 90 | 65 | 1000 | 3% | +2% or less |
| Example 14 | DES | 0.30 wt % | 92 | 75 | 1200 | +2% or less | +2% or less |
| Example 15 | DES | 0.50 wt % | 94 | 82 | 1300 | +2% or less | +2% or less |
| Example 16 | DES | 0.80 wt % | 95 | 90 | 1400 | +2% or less | +2% or less |
| Example 17 | DES | 1.0 wt % | 96 | 92 | 1450 | +2% or less | +2% or less |
| Example 18 | DES | 3.0 wt % | 96 | 90 | 1400 | +2% or less | +2% or less |
| Example 19 | DES | 5.0 wt % | 95 | 87 | 1350 | +2% or less | +2% or less |
| Example 20 | DES | 10.0 wt % | 88 | 65 | 1150 | +2% or less | +2% or less |
| Example 21 | DES | 20.0 wt % | 72 | 52 | 700 | +2% or less | +2% or less |
| Example 22 | MES | 1.0 wt % | 94 | 90 | 1450 | +2% or less | +2% or less |
| Example 23 | DMS | 1.0 wt % | 94 | 88 | 1450 | +2% or less | +2% or less |

Note:
DES: diethyl sulfite;
MES: methyl ethyl sulfite;
DMS: dimethyl sulfite;

TABLE 3

| | Additive | | High rate characteristic test | | High temperature cycle characteristic test | | High temperature storage characteristics |
|---|---|---|---|---|---|---|---|
| | | | | | High temperature (45° C.) | Change in | Change in battery |
| | | | 3 C/0.2 C discharge | 10 C/0.2 C discharge | charge-discharge | battery | thickness after |
| | Compound name | Addition amount | capacity ratio | capacity ratio | cycle life (the number of times) | thickness after cycle test | storage at 85° C. |
| Example 24 | DES | 0.05 wt % | 82 | 45 | 370 | 70% | 15% |
| Example 25 | DES | 0.10 wt % | 89 | 55 | 880 | 3% | +2% or less |
| Example 26 | DES | 0.30 wt % | 90 | 65 | 950 | +2% or less | +2% or less |
| Example 27 | DES | 0.50 wt % | 92 | 70 | 1000 | +2% or less | +2% or less |
| Example 28 | DES | 0.80 wt % | 93 | 84 | 1050 | +2% or less | +2% or less |
| Example 29 | DES | 1.0 wt % | 94 | 88 | 1100 | +2% or less | +2% or less |
| Example 30 | DES | 3.0 wt % | 94 | 86 | 1050 | +2% or less | +2% or less |
| Example 31 | DES | 5.0 wt % | 94 | 82 | 1000 | +2% or less | +2% or less |
| Example 32 | DES | 10.0 wt % | 86 | 55 | 870 | +2% or less | +2% or less |
| Example 33 | DES | 20.0 wt % | 68 | 45 | 600 | +2% or less | +2% or less |
| Example 34 | MES | 1.0 wt % | 93 | 86 | 1150 | +2% or less | +2% or less |
| Example 35 | DMS | 1.0 wt % | 93 | 82 | 1100 | +2% or less | +2% or less |

Note:
DES: diethyl sulfite;
MES: methyl ethyl sulfite;
DMS: dimethyl sulfite;

It can be understood by comparison of Tables 1 to 3 that coke used as the conductive agent in Examples 12 to 23 permits improving the 10 C/0.2 C discharge capacity ratio and the charge-discharge cycle life, compared with acetylene black used as the conductive agent in Examples 1 to 11 and graphite used as the conductive agent in Examples 24 to 35. It should also be noted that coke used in Examples 12 to 23 permits most prominently suppressing the swelling rate when the addition amount of the linear sulfite is small in spite of the situation that the coke has a specific surface area larger than that of acetylene black and that of graphite.

Incidentally, manufactured was a nonaqueous electrolyte secondary battery equal in construction to the nonaqueous electrolyte secondary battery manufactured in each of Examples 1 to 11, except that acetylene black used as the conductive agent had a specific surface area of 70 $m^2/g$ as measured by the BET method. The nonaqueous electrolyte secondary battery thus manufactured was subjected to the high rate characteristic test, the high temperature charge-discharge cycle characteristic test, and the high temperature storage test under the conditions equal to those described previously. The high rate characteristics of the secondary battery were certainly improved, compared with the secondary battery for Examples 1 to 11. However, the charge-discharge cycle life, the rate of change in the battery thickness after the cycle test, and the rate of change in the battery thickness after the storage at 85° C. were found to have been deteriorated, unlike the case of using coke as the conductive agent.

The graphitizing carbon such as coke having a layer spacing $d_{002}$ falling within a range of 0.344 nm to 0.352 nm and a crystallite size Lc of 10 nm or less is crystallized appropriately. Therefore, in the case of using coke as the conductive agent, it is possible to improve the high rate characteristics, the high temperature charge-discharge cycle characteristics and the high temperature storage characteristics of the nonaqueous electrolyte secondary battery. On the other hand, a conductive agent such as acetylene black or graphite fails to satisfy the conditions of the layer spacing $d_{002}$ and the crystallite size Lc noted above. Such being the situation, the secondary battery using coke as the conductive agent permits improving the battery characteristics noted above, compared with the secondary battery using acetylene black or graphite as the conductive agent, as apparent from the experimental data.

The specific surface area, the layer spacing $d_{002}$, and the crystallite size Lc of the conductive agent used in the Examples described above were measured as follows.

<Specific Surface Area as Measured by BET Method of Conductive Agent>

Autosorb (trade name of a measuring apparatus manufactured by Yuasa Ionics Inc.) was used for measuring the specific surface area as measured by the BET method of the conductive agent. The sample amount was set at about 0.5 g. Also, a deaeration treatment was applied as a pretreatment to the sample at 120° C. for 15 minutes.

<Measurement of Layer Spacing $d_{002}$ of (002) Plane of Conductive Agent>

The layer spacing $d_{002}$ of the (002) plane was obtained by the FWHM (Full Width at Half Maximum) middle point method from a powder X-ray diffraction spectrum. The scattering correction such as correction of the Lorentz scattering was not performed for obtaining the layer spacing $d_{002}$ of the (002) plane.

<Measurement of Crystallite Size Lc of Conductive Agent>

The crystallite size Lc was measured by an X-ray diffraction method. In performing the measurement by the X-ray diffraction method, CuKα was used as the X-ray source, and a high purity silicon was used as a standard substance. The crystallite size Lc was obtained from the position and the half-width of each diffraction peak. The FWHM (Full Width at Half Maximum) middle point method was employed as the calculating method.

The method of measuring the amount of the linear sulfite contained in the secondary battery for the Examples described above will now be described on the basis of Example 5.

After the initial charge-discharge step, the circuit of the secondary battery for Example 5 was left open for 5 hours or more so as to stabilize sufficiently the potential of the secondary battery. Then, the secondary battery was dismantled within a glove box having an Ar concentration of 99.9% or more and a dew point not higher than −50° C. so as to take out the electrode group. The electrode group was, then, put in a centrifugal tube, and dimethyl sulfoxide (DMSO)-$d_6$ was added to the centrifugal tube, followed by sealing the centrifugal tube. Further, the centrifugal tube was taken out of the glove box and subjected to the centrifugal separation. In the next step, a mixed solution consisting of the liquid electrolyte and DMSO-$d_6$ was taken from the centrifugal tube within the glove box. The mixed solution in an amount of about 0.5 mL was put in an NMR test tube of 5 mm ϕ so as to carry out the NMR measurement. An apparatus "JNM-LA400WB" manufactured by JEOL. Ltd, was used for the NMR measurement. The observed nucleus was $^1H$, the observation frequency was 400 MHz, and the residual proton signal that was slightly contained (2.5 ppm) in dimethyl sulfoxide (DMSO)-$d_6$ was utilized as an internal standard. The measuring temperature was set at 25° C. In the $^1HNMR$ spectrum, a peak corresponding to EC (ethylene carbonate) was observed in the vicinity of 4.5 ppm, and a peak corresponding to DES (diethyl sulfite) was observed in the vicinity of 1.3 ppm, 3.97 ppm and 4.03 ppm. The experimental data supports that DES was contained in the nonaqueous electrolyte present in the secondary battery for the Examples after the initial charge-discharge step.

Further, it is possible to calculate the residual DES amount in the nonaqueous electrolyte by obtaining the ratio of the NMR integration intensity of DES to the NMR integration intensity of EC in the $^1HNMR$ spectrum.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte secondary battery, comprising:
   a case;
   a nonaqueous electrolyte provided in the case and containing a linear sulfite;
   a positive electrode provided in the case and capable of absorbing-releasing Li element or Li ions; and
   a negative electrode provided in the case and containing a lithium titanium oxide and a conductive agent that includes a carbonaceous material, wherein the linear sulfite includes at least one kind of the compound selected from the group consisting of: dimethyl sulfite, diethyl sulfite, and methyl ethyl sulfite.

2. The nonaqueous electrolyte secondary battery according to claim 1, wherein the linear sulfite is contained in the nonaqueous electrolyte in an amount of 0.8 to 5% by weight.

3. The nonaqueous electrolyte secondary battery according to claim 1, wherein the nonaqueous electrolyte comprises an organic solvent including
γ-butyrolactone, and the volume ratio of
γ-butyrolactone to the organic solvent is 30% to 90%.

4. The nonaqueous electrolyte secondary battery according to claim 1, wherein the carbonaceous material has a layer spacing $d_{002}$ of the (002) plane falling within a range of 0.344 nm to 0.352 nm and a crystallite size Lc in the C-axis direction of 10 nm or less.

5. The nonaqueous electrolyte secondary battery according to claim 1, wherein the carbonaceous material includes a graphitizing carbon having a layer spacing $d_{002}$ of the (002) plane falling within a range of 0.344 nm to 0.352 nm and a crystallite size Lc in the C-axis direction of 10 nm or less.

6. The nonaqueous electrolyte secondary battery according to claim 5, wherein the graphitizing carbon is provided by coke.

7. The nonaqueous electrolyte secondary battery according to claim 5, wherein the graphitizing carbon has a specific surface area of 10 $m^2$/g to 100 $m^2$/g as measured by the BET method.

8. The nonaqueous electrolyte secondary battery according to claim 1, wherein the lithium titanium oxide has a Spinel type structure.

9. The nonaqueous electrolyte secondary battery according to claim 1, wherein the lithium titanium oxide is represented by a chemical formula $Li_{4+x}Ti_5O_{12}$ ($0 \leq x \leq 3$).

10. The nonaqueous electrolyte secondary battery according to claim 1, further comprising a separator interposed between the positive electrode and the negative electrode.

11. The nonaqueous electrolyte secondary battery according to claim 1, further comprising:
a $Li_2SO_3$-containing layer formed on a surface of the negative electrode.

12. The nonaqueous electrolyte secondary battery according to claim 11, wherein the $Li_2SO_3$-containing layer is formed of an inorganic material including $Li_2SO_3$.

13. The nonaqueous electrolyte secondary battery according to claim 11, wherein the $Li_2SO_3$-containing layer is formed of inorganic materials including $Li_2SO_3$ and LiF.

14. The nonaqueous electrolyte secondary battery according to claim 11, wherein the carbonaceous material has a layer spacing $d_{002}$ of the (002) plane falling within a range of 0.344 nm to 0.352 nm and a crystallite size Lc in the C-axis direction of 10 nm or less.

15. The nonaqueous electrolyte secondary battery according to claim 11, wherein the lithium titanium oxide has a Spinel type structure.

16. The nonaqueous electrolyte secondary battery according to claim 11, wherein the lithium titanium oxide is represented by a chemical formula $Li_{4+x}Ti_5O_{12}$ ($0 \leq x \leq 3$).

* * * * *